*Maupin & Rooke.*
Ports for Vessels.

Nº 30,075. Patented Sept. 18, 1860.

Witnesses:

Inventors:

UNITED STATES PATENT OFFICE.

WM. G. MAUPIN AND JOHN B. ROOKE, OF PORTSMOUTH, VIRGINIA.

SHIP'S AIR-PORT.

Specification of Letters Patent No. 30,075, dated September 18, 1860.

*To all whom it may concern:*

Be it known that we, W. G. MAUPIN and JOHN B. ROOKE, both of Portsmouth, in the county of Norfolk and State of Virginia, have invented a new and useful Improvement in Devices for Opening and Closing Air-Ports for Vessels; and we do hereby declare that the following is a full, clear, and exact description thereof, reference being had to the accompanying drawings, making part of this specification, in which—

Figure 1:
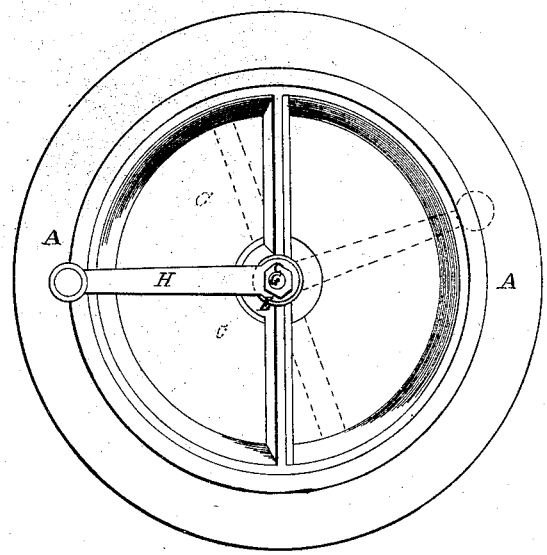
Figure 2:
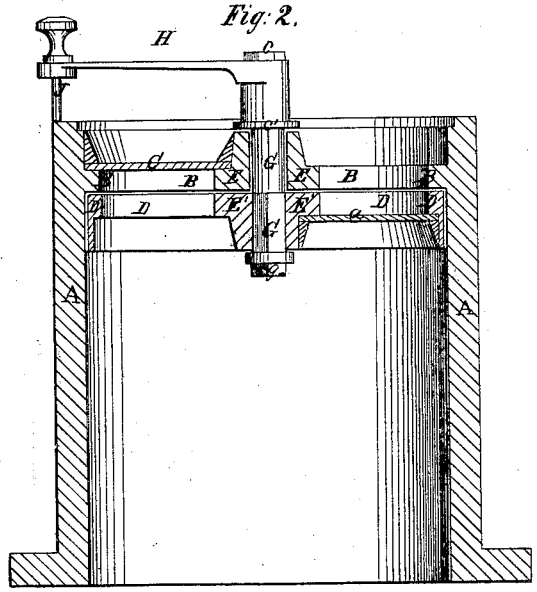

Figure 1 represents an end view of the improved air-port for vessels. Fig. 2 is a longitudinal diametrical section taken through the port.

Similar letters of reference indicate corresponding parts in both figures.

To enable those skilled in the art to fully understand our invention we will proceed to describe its construction and operation.

A is the flanged pipe or port, made in the usual manner; and B is a circular ring that is secured tightly into one end of the port into which ring a semicircular glass plate C, is suitably fastened. This leaves one half of the port open, and the other half tightly closed, the ring is secured water-tight and it is immovably fixed to the pipe A.

D is a circular frame or ring for closing the other half of the port. This frame with its semicircular glass plate is placed behind the ring B, and kept in close contact with it. Each circular frame B, D, has a central enlargement or eye E, E', through which passes a stem G, one part of said stem is round and turns easily in the stationary eye E, and the other part is square and fits into a square hole in the eye E', so that by turning the stem this ring with its glass will turn with it. H is a flat handle with a knob on its extreme end, this handle is secured to the axis or stem G, of the rings by a nut $c$, and flange $c'$, and the whole are secured together by a nut and washer $g$. J, is a pin projecting from the handle H, that rests against the end of pipe A, as shown in Fig. 2.

By turning the handle H, the inner ring D, will move with it and by this means the glass plate in this ring may be made to close the opening in the ring B, or to partially close it as occasion may require. The two rings B, D, are held firmly together so as to be kept water tight by virtue of the spring of handle H, acting against the end of the pipe A, as described, and this action of the spring may be increased or diminished by tightening up or unscrewing the nut $g$. The handle H, will not only keep the two rings tightly together, but, by means of this handle H, the inner ring may be rotated, or may be fixed at any desired point, either opened or closed.

What we do claim as new, and desire to secure by Letters Patent, is—

The arrangement of the ring B, and glass C, with the ring D, eyes E, E, stem G, and pipe A, all as and for the purposes herein set forth and described.

WM. G. MAUPIN.
JOHN B. ROOKE.

Witnesses:
C. W. DOWNING,
JAMES L. HATTON.